Figure 1:
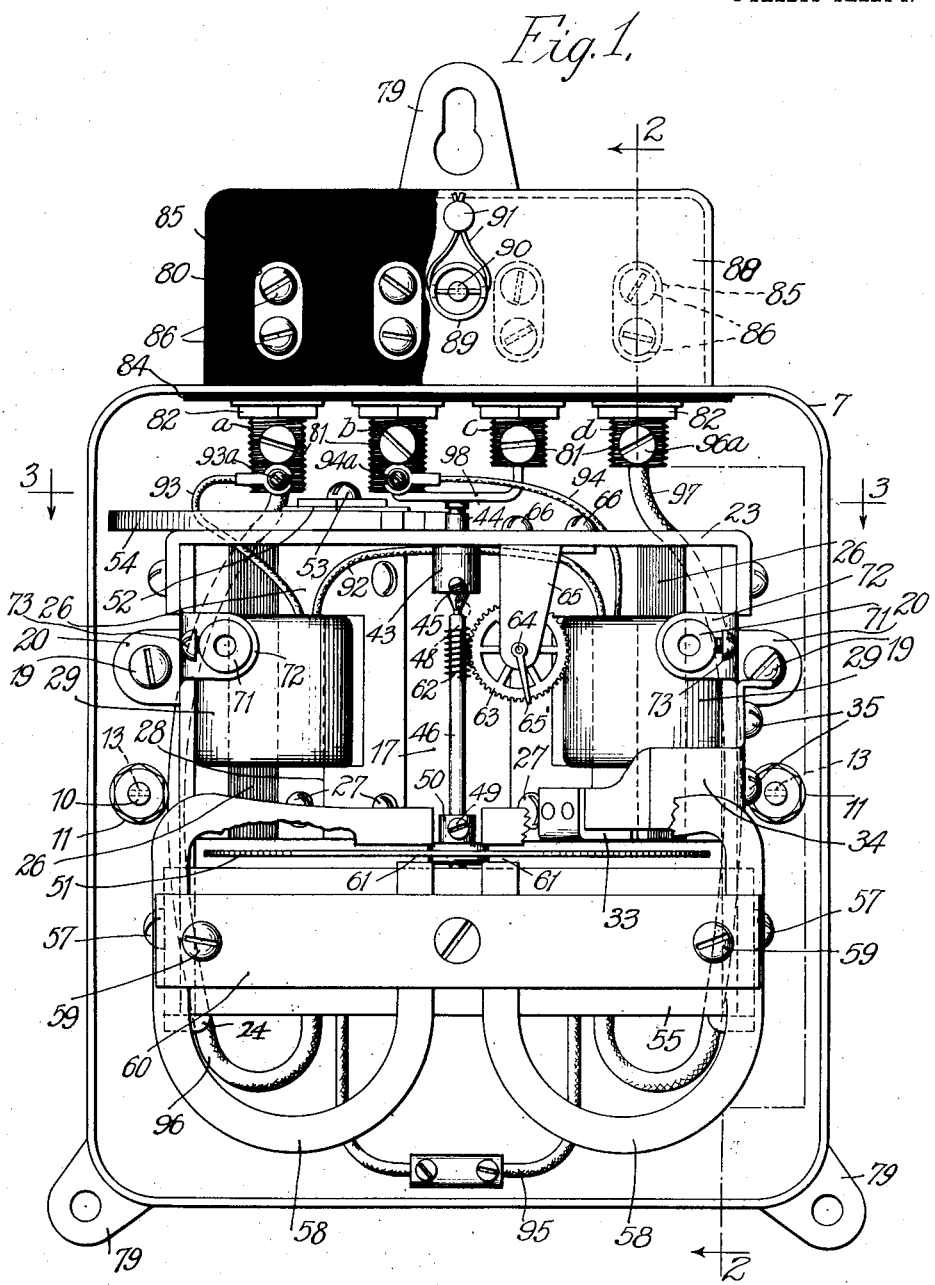

G. A. SCHEEFFER.
INDUCTION WATTMETER.
APPLICATION FILED AUG. 31, 1910.

1,082,653.

Patented Dec. 30, 1913.

4 SHEETS—SHEET 1.

Witnesses:
Leonard W. Novander
George C. Higham

Inventor
Gustave A. Scheeffer
By Brown Williams
Attorneys

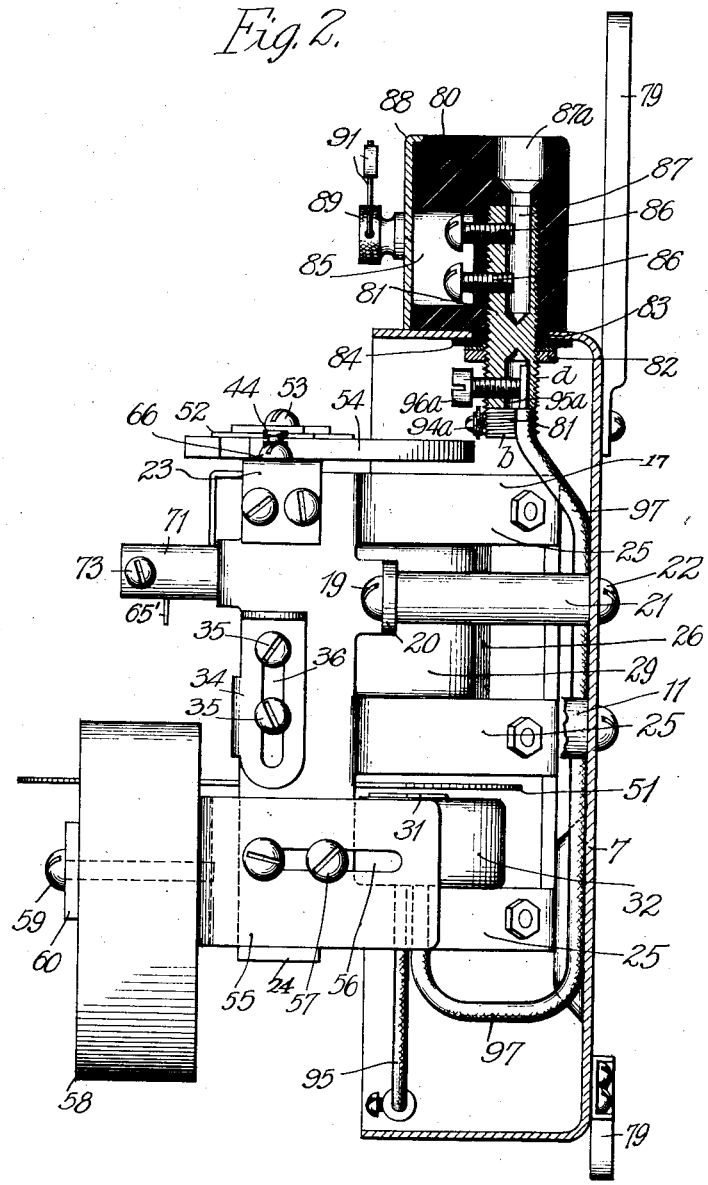

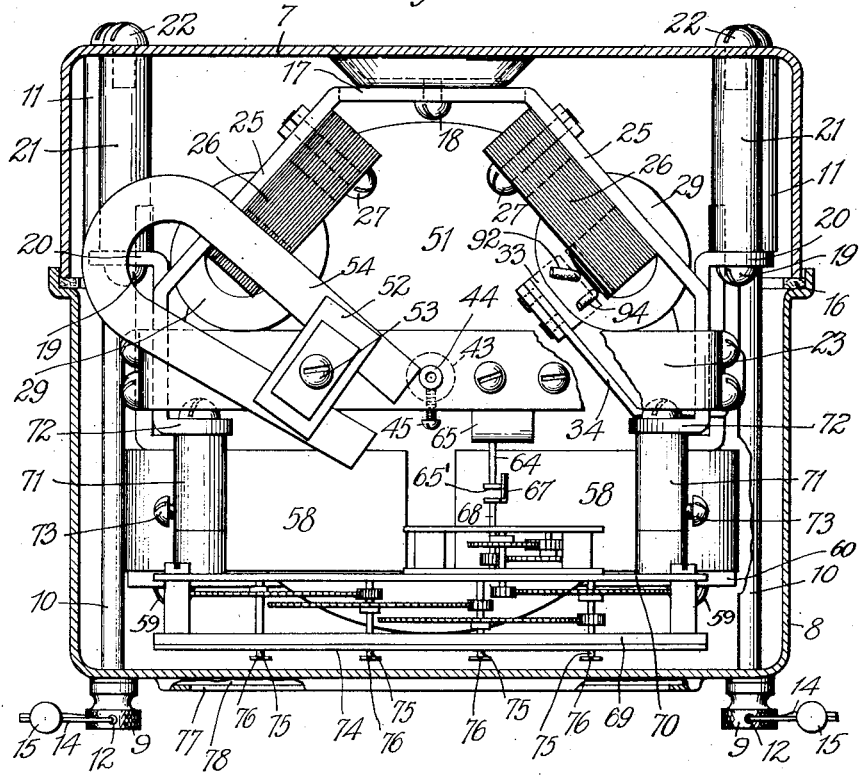

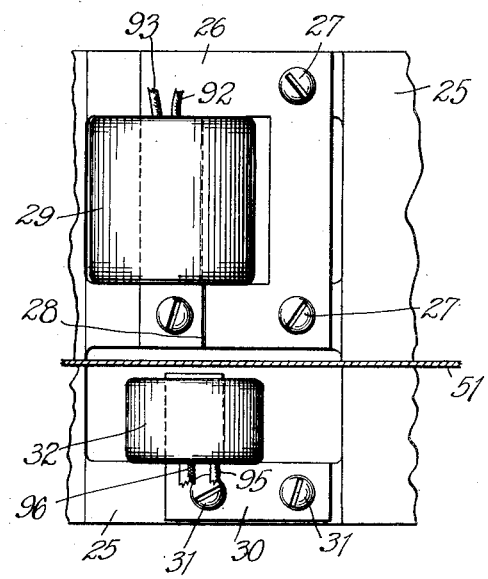
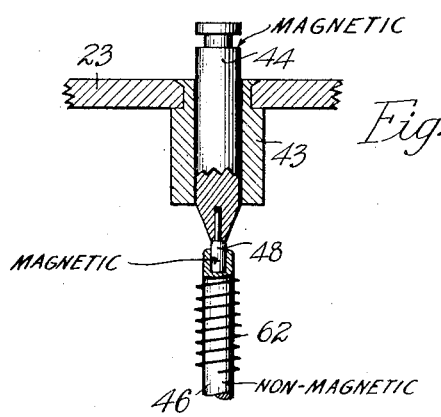

UNITED STATES PATENT OFFICE.

GUSTAVE A. SCHEEFFER, OF INDIANAPOLIS, INDIANA, ASSIGNOR, BY MESNE ASSIGNMENTS, TO ROLLER SMITH CO., OF NEW YORK, N. Y., A CORPORATION OF NEW YORK.

INDUCTION-WATTMETER.

1,082,653. Specification of Letters Patent. Patented Dec. 30, 1913.

Application filed August 31, 1910. Serial No. 579,942.

*To all whom it may concern:*

Be it known that I, GUSTAVE A. SCHEEFFER, a citizen of the United States, residing at Indianapolis, in the county of Marion and State of Indiana, have invented a certain new and useful Improvement in Induction-Wattmeters, of which the following is a full, clear, concise, and exact description, reference being had to the accompanying drawings, forming a part of this specification.

My invention relates to instruments for measuring alternating currents of electricity, and is particularly directed to an integrating wattmeter of the induction type.

It is the object of my invention to provide such a device, improved in operation and construction, the latter features being particularly a matter of providing for convenient access to the various parts to facilitate inspection, adjustment and repair.

It is one of the important objects of my invention to overcome the undesirable vibrating or "singing" of the armature, a difficulty so prevalent in alternating current meters of the prior art. I eliminate this difficulty by providing what may well be termed a "magnetic cushion" for one bearing, the upper bearing, of the armature shaft, the other bearing being jeweled.

A further important feature of my invention lies in the provision of a general supporting unit in the way of a cradle upon which the coils, the armature, the integrating mechanism, and the brake magnet, those parts usually requiring the most attention, are mounted. It is a feature that this cradle and the parts carried thereby can be removed bodily from the meter casing and that the cradle itself is so formed that easy access may be had to all the parts carried by it.

A further feature of my invention lies in the protective arrangement for the terminals, this construction providing for complete insulation and protection against tampering and unwarranted manipulation.

My invention is illustrated in the accompanying drawings in which—

Figure 1 is a front elevational view of the device, the cover being removed and the parts being broken away to reveal the interior construction; Fig. 2 is a side elevational view of the device, parts being shown in section on the plane of the broken line 2—2 of Fig. 1, looking in the direction indicated by the arrows; Fig. 3 is a plan view of the operating mechanism, the casing being shown in section taken on the plane of the line 3—3 of Fig. 1; Fig. 4 is an isolated front elevational view of the disk armature, the means for supporting it, and two of the associated coils; Fig. 5 is an isolated elevational view of one set of coils, showing the armature in section therebetween; and Fig. 6 is an enlarged isolated detailed view of the bearing which provides the magnetic cushion for the armature shaft.

The meter casing comprises two parts, a base part 7 and a cover part 8, these two parts being held together by means of thumb nuts 9, 9 having threaded engagement with the ends of the rods 10, 10 extending from the posts 11, 11, secured to the base part, and passing through registering openings in the cover part. If desired each thumb nut is provided with a transverse aperture 12, which is adapted to register with an aperture 13 in the associated rod 10, through which apertures a wire 14 may be passed, as shown in Fig. 3, the free ends of the wire being connected together by the seal 15, all to prevent unauthorized access to the interior of the case. A gasket 16 of felt or other suitable material is disposed between the casing parts to exclude moisture and dust.

The supporting cradle is shown at 17 and is secured to the base part of the casing 7 by means of a screw 18 and screws 19, 19 passing through the lugs 20, 20 and into the posts 21, 21, secured to the part 7 by means of screws 22, 22. It is to be noted that the cradle 17, in plan, is half octagonal in form, presenting an open front and that the top of the cradle is spanned by the cross bar 23, while the bottom thereof is spanned by the cross bar 24. To the oblique sides 25, 25, near the tops thereof, the laminated iron cores 26, 26 are secured by means of screws 27, 27. The cores 26 are each of complete rectangular shape, except for the gap 28, and upon one of the vertical legs of each of these cores, a pressure coil 29 is mounted. The walls 25, 25 of the cradle 17 are, of course, cut out to accommodate these coils, as clearly shown in Fig. 5.

Below each of the cores 26 an iron core 30 is secured to the wall 25 by means of screws 31, 31, this core being L-shaped and carrying the current coil 32 on the vertical leg thereof. The vertical leg of the core 30 is disposed below the gap 28 in the core 26, and the upper end of the core 30 is sufficiently spaced from the bottom of the core 26 to permit the movement of the armature disk therebetween, as will be described later. Here, again, the wall 25 is cut out to accommodate the coil. The core 26 is formed as it is and is more or less definitely related to the resistance of the pressure coil so that the proper lag of the current in that coil behind the current in the series coil may be obtained. In order to determine and maintain this lag to a nicety, a nonmagnetic shading coil 33 is carried by the supporting member 34 in close proximity to the pole ends of the core 26, the supporting member 34 being secured to the cradle 17 by means of screws 35, 35 passing through a slot 36 in the former and having threaded engagement in the latter. It is clear that this arrangement provides for the vertical adjustment of the shading coil so that the inductive effect may be properly regulated.

The lower bearing for the armature shaft is in the form of a jewel 37 set in a pin 38 which is held in the sleeve 39, threaded and locked in the aperture in the center of the cross piece 24, by means of the leaf spring member 40 extending from a post 41 secured to the cross piece 24 by means of the screw 42, the leaf spring being clamped between the head of the screw and the post. The upper cross piece 23 is provided with an opening registering with the central opening in the lower cross piece and in this opening the sleeve 43 is riveted, as clearly indicated in Fig. 6, the axis of this sleeve being, therefore, co-incident with the axis of the jewel bearing. In the sleeve 43 a pin 44 of magnetic material is disposed, this pin being vertically adjustable and being locked in any desired position by means of the set screw 45 passing through the sleeve and engaging the pin. Between the bearings 37 and 44, the armature shaft 46 is disposed, this shaft being provided at its lower end with the steel pin 47 for coöperation with the jewel. The armature shaft proper is constructed of non-magnetic material, but the steel pin 48 secured in the upper end of the armature shaft is the magnetic element which, extending into a bore in the par 44, coöperates with that part magnetically as will be described later. The pin 44, of course, is adjusted so that there will be just enough play for the proper rotation of the armature shaft. Secured upon the armature shaft 46 by means of set screw 49 is a sleeve 50 of non-magnetic material which carries the aluminum disk armature 51, this armature being so disposed upon the shaft that it may pass between the poles of the iron cores, as clearly shown in the drawings. The disk 51 may be lifted from its lower bearing by manipulation of a screw 51$^a$ coöperating with a leaf spring 51$^b$ having bifurcated end under the middle of the disk. The diameter of the armature is such that it may fit in the supporting cradle 17 and is such that the pole ends of the magnet supported on the oblique walls of the cradle will be near the periphery thereof.

Secured upon the top of the cross piece 23, and under the non-magnetic retaining plate 52, by means of the screw 53 is the horse-shoe magnet 54, one pole of which is disposed in close proximity to that part of the pin 44 extending above the cross bar 23. It is evident that this structure provides for the ready adjustment of the magnet so that one of the poles thereof may be disposed more or less closely to the magnet pin 44, as desired. It is evident that if there is no play between the armature shaft and its bearings, it will be impossible for the armature to rotate, and it is further clear that if the armature is to rotate under the inductive influence of the coils, there must be a considerable play between these parts, and it has been found in meters of the prior art that the alternating fluxes cause the armature, and consequently its shaft, to "sing" or vibrate to the extent of its play. However, since the magnetic pin 44 is kept in a magnetized condition under the influence of the horse-shoe magnet 54, there will be a tendency to hold the steel pin 48, and consequently the shaft and its armature, against this tendency to "sing." This is the "magnetic cushion" which has hereinbefore been referred to, and it is clear that the effect of this influence can readily be adjusted, by the arrangement proposed, to meet the requirements.

Secured upon the cradle member 17, under the disk 51, is the auxiliary cross piece 55. In plan, this cross piece is U-shaped and the rearwardly extending arms thereof are provided with a longitudinal slot 56 through which screws 57, threading into the cradle part, may pass. This arrangement provides for moving the cross piece 55 forwardly and rearwardly as desired. To the face of this cross piece the damping or brake magnets 58, 58 are secured by means of screws 59, 59 passing through the retaining plate 60 and threading into the cross piece, as clearly shown in the drawings. These brake magnets are each more or less C-shaped so as to embrace the disk, the latter operating in the gaps 61, 61, as is well known in the art. These brake magnets may be moved toward or away from the periphery of the disk to secure the proper calibration. Near its upper end the armature shaft 46 is provided with a worm 62 which meshes with the worm wheel 63 mounted upon a shaft 64 journaled in a supporting bracket 65, which, in turn is secured by means of the screws 66, 66 to the under side of the cross-piece 23. The shaft 64 carries an arm 65' which is adapted to engage an arm 67 on the main shaft 68 of an integrating mechanism carried on and between the plates 69 and 70, which in turn are supported upon the posts 71, 71 extending from lugs 72, 72 on the cradle. Screws 73, 73 hold the integrating mechanism in place, the arrangement being such that the shaft 68 is then in alinement with the shaft 64, as illustrated in Fig. 3. The integrating mechanism is provided with a face 74 through which the various shafts 75, 75 in metric relation, extend, these shafts each having a pointer 76 which coöperates with the dials painted or printed on the face. In order that these dials may be exposed to view, the covering of the casing has an opening 77 in back of which a glass 78 is set in some suitable manner, this opening being preferably of sufficient size to disclose other parts of the device so that their operation may be observed.

From the foregoing it will be seen that all the operating parts are inclosed and well protected. The outside of the casing carries nothing more than the lugs 79, 79 for hanging the meter in a convenient place and a massive insulating block 80 disposed upon the top of the part 7 and held in place in the manner best illustrated in Fig. 2. Meters of this kind are usually provided with four terminals, two for the shunt circuit and two for the series circuit, and these I have shown in the way of four similar comparatively heavy rods 81, 81. The insulating block 80 is provided with four vertical bores, near the rear face thereof, which are screw threaded to receive the rods 81, 81, which are correspondingly threaded upon the outside. The bores are of that particular diameter only part way from the bottom of the block, and the rods 81 extending considerably below the block and through registering openings in the casing part 7 into the casing. Thumb nuts 82, 82 are screwed upon the rods 81, 81, and with proper insulating washers 83, 83 and an insulating strip 84 intervening, serve to firmly clamp the block upon the casing, the latter being, by these means, thoroughly insulated from each of the rods. In forward alinement with each of the bores in the block 80 is a pocket 85 in which the heads of screws 86, 86, passing through the resulting wall in the block and into the respective rod 81, are deeply disposed. These screws pass into a longitudinal bore 87 in the rod 81 to clamp in place the proper external circuit wire entering by way of the part 87ª of the bore. The pockets 85 are all covered over by a metallic plate 88 which is secured in place by means of the thumb screw 89 threaded upon a stud 90 set in the block 80 in some suitable manner, this thumb screw being sealed by the wire and seal 91 in the same manner as has been described relative to the sealing of the cover part of the casing. The two pressure coils are connected in series by means of a conductor 92, and by means of conductors 93 and 94 are connected across the terminals a and b, these conductors being secured to the outsides of these terminals by screws 93ª and 94ª. The two current coils are connected in series by means of the conductor 95, and by means of the conductors 96 and 97 are connected between the terminals a and d, each of these conductors passing into the bore 95ª in the lower end of the rod 81 and being held in place by the set screw 96ª. The terminal a is connected to one side of the line and the terminal d is connected to the severed end in that side of the line. Either the terminal b or the terminal c, since they are bridged by the conductor 98, is connected to the other side of the line, thus putting the current coils in series and the pressure coils in shunt.

It will be seen that the semi-octagonal form of the cradle is very effective in distributing the parts so that easy access may be had to any one of them. The entire cradle can be removed from the casing by the mere removal of the screws 18 and 19, and with it the coils, armature, magnets, and integrating mechanism. The skeleton form of the cradle provides access from the rear after the cradle has been removed from the casing, and in general it may be said that the skeleton form of the cradle is effective in affording access to any part whatever after being removed from the casing.

The insulating block which has been described effectively protects each of the terminals against crosses, short-circuits, and injurious tampering, and the terminals leave the interior of the casing in a manner so that dust and moisture may not find their way into the interior.

I claim as new and desire to secure by Letters Patent:

1. In an induction watt meter, an armature, a bearing, a shaft for said armature positively resting upon said bearing, and a magnetically excited bearing engaging the upper end of said shaft wherein the shaft is held against lateral movement due to the magnetic influence of said excited bearing and against movement longitudinally of its axis due to its mechanical engagement with said excited bearing.

2. In an induction watt meter, an armature, a shaft for said armature, a jewel bearing for the lower end of said shaft, which bearing said shaft mechanically engages at all times, a bearing for the upper end of said shaft, said bearing mechanically holding said shaft against axial play, and magnetic means associated with the upper bearing, the magnetic influence of said magnetic member serving to hold said shaft against lateral movement in said upper bearing.

3. In an induction watt-meter, an armature, a lower bearing, a shaft for said armature positively resting upon said lower bearing, a tip of magnetic material for the upper end of said shaft, a bearing for coöperation with said tip to mechanically hold said shaft against axial play, and magnetic means associated with said bearing, the magnetic influence of said magnetic means alone serving to hold said tip against lateral movement in said upper bearing.

4. In an induction watt-meter, an armature, a bearing, a shaft for said armature positively resting upon said bearing, a bearing of magnetic material for said armature, said bearing mechanically holding said armature against axial play, and a magnet for exciting said last-named bearing, lateral displacement of the armature being prevented by the magnetic influence of said excited bearing.

5. In an induction watt-meter, an armature, a lower bearing, a shaft for said armature positively resting upon said lower bearing, a bearing of magnetic material for the upper end of said shaft engaging said shaft and mechanically holding the same against axial play, and a magnet adjustably disposed relatively to said bearing for magnetically exciting the same, lateral displacement of the armature being prevented by the magnetic influence of said excited bearing.

6. In combination, a bearing, a rotatable shaft positively resting at its lower end on said bearing, a magnetically excited bearing for its upper end, mechanically holding it against axial play, the magnetic influence of said excited bearing being such as to prevent lateral movement of said shaft, a disk armature on said shaft, and field windings in inductive relation to said disk.

7. In an induction wattmeter, a supporting member, a bearing in said supporting member, a sleeve mounted in said supporting member in alinement with said bearing, a second bearing member of magnetic material adjustably disposed in said sleeve, and a magnet adjustably supported upon said supporting member and having one of its poles in proximity to one side of said magnetic bearing.

8. In an induction wattmeter, a supporting cradle removable from the casing as a unit, said cradle being of semi-octagonal form and open toward the front, windings carried upon the oblique walls, and an armature carried by said cradle in proper association with said windings.

9. In an induction wattmeter, a supporting cradle removable from the casing as a unit, said cradle being of semi-octagonal form and open toward the front, windings carried upon the oblique walls, cross pieces at the top and bottom of said cradle, and an armature journaled between said cross pieces.

10. In an induction wattmeter, a casing, a cradle removable from said casing as a unit, said cradle being semi-octagonal in form and having an upper and a lower cross piece, a jewel bearing in the lower cross piece, a magnetic bearing in the upper cross piece, an armature shaft journaled between said bearings, an armature carried by said shaft, and coils carried by said cradle in association with said armature.

11. In an induction wattmeter, in combination, a casing, a cradle removable from said casing as a unit, said cradle being semi-octagonal in form and presenting its open side forwardly, cores secured to the inside faces of the oblique walls of said cradle, coils mounted on said cores, a disk armature operating between the pole ends of said cores, a shaft for said armature, bearings for said shaft, and cross pieces on said cradle in which said bearings are mounted.

12. In an induction wattmeter, a casing, a cradle comprising a back wall and side walls mounted in said casing open toward the front, a cross piece extending across the front of the side walls of said cradle, said cross piece being adjustable forwardly and rearwardly, an armature disk mounted in said cradle, and a C-shaped damping magnet embracing said armature disk and carried by said adjustable cross piece.

In witness whereof, I hereunto subscribe my name this 23rd day of August, A. D. 1910.

GUSTAVE A. SCHEEFFER.

Witnesses:
WILLIAM W. HAMMOND,
JOHN E. SCOTT.